United States Patent
Yin et al.

(10) Patent No.: US 12,056,291 B2
(45) Date of Patent: Aug. 6, 2024

(54) ELECTRONIC DEVICE AND SENSITIVITY ADJUSTMENT METHOD FOR SENSOR

(71) Applicant: ASUSTeK COMPUTER INC., Taipei (TW)

(72) Inventors: Ding-Jun Yin, Taipei (TW); Chin-Chuan Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/968,800

(22) Filed: Oct. 19, 2022

(65) Prior Publication Data

US 2024/0028136 A1    Jan. 25, 2024

(30) Foreign Application Priority Data

Jul. 22, 2022 (TW) .................................. 111127497

(51) Int. Cl.
*G06F 3/01* (2006.01)
*G06F 3/0346* (2013.01)
*G06F 3/038* (2013.01)

(52) U.S. Cl.
CPC ............ *G06F 3/0346* (2013.01); *G06F 3/038* (2013.01)

(58) Field of Classification Search
CPC ........ G06F 3/0346; G06F 3/038; G06F 1/169; G06F 3/023; G06F 3/0338; G06F 3/03543; G06F 3/03547; G06F 3/04892; G06F 2203/0382; G06F 3/01
See application file for complete search history.

(56) References Cited

U.S. PATENT DOCUMENTS

| | | | |
|---|---|---|---|
| 2009/0325710 A1* | 12/2009 | Filer | A63F 13/211 463/37 |
| 2013/0232280 A1* | 9/2013 | Perek | H04M 1/0254 710/14 |
| 2014/0320428 A1* | 10/2014 | Matsuda | G06F 3/0416 345/173 |
| 2018/0024647 A1* | 1/2018 | Coletrane-Pagan | G06F 3/0338 345/158 |

FOREIGN PATENT DOCUMENTS

| | | |
|---|---|---|
| CN | 203070207 | 7/2013 |
| CN | 106020671 | 10/2016 |
| CN | 108287611 | 7/2018 |
| CN | 111176464 | 4/2022 |
| DE | 102018116598 A1 * | 1/2020 |

* cited by examiner

*Primary Examiner* — Lunyi Lao
*Assistant Examiner* — Jarurat Suteerawongsa
(74) *Attorney, Agent, or Firm* — JCIPRNET

(57) ABSTRACT

An electronic device and a sensitivity adjustment method of a sensor are disclosed. The method includes: in a situation that a target program is executed by the electronic device, receiving sensing data from a target sensor; activating a sensitivity adjustment rule according to the target program; adjusting the sensing data according to the sensitivity adjustment rule; and providing the adjusted sensing data to the target program.

13 Claims, 3 Drawing Sheets

ELECTRONIC DEVICE AND SENSITIVITY ADJUSTMENT METHOD FOR SENSOR

CROSS-REFERENCE TO RELATED APPLICATION

This application claims the priority benefit of Taiwan application serial no. 111127497, filed on Jul. 22, 2022. The entirety of the above-mentioned patent application is hereby incorporated by reference herein and made a part of this specification.

BACKGROUND

Technical Field

The disclosure relates to an electronic device and a sensitivity adjustment method of a sensor thereof.

Description of Related Art

Most portable computer devices such as smart phones and tablet computers are provided with built-in motion sensors such as gyroscopes and accelerometers to detect physical actions such as shaking and tilting performed by the user on the portable computer devices. For example, when an action game program is executed, the motion sensor can generate sensing data in response to physical actions such as shaking and tilting of the portable computer device. Then, the game program can control the game character to move in a specific direction or change the perspective in the game according to the sensing data.

However, the setting requirement of the sensitivity of the motion sensor may differ for different types of applications. For example, when a game program is executed, if the sensitivity of the motion sensor is appropriately increased, it helps to quickly reflect the user's operation on the game character, so that the operation of the game character is more responsive. However, when other types of applications are executed, if the sensitivity of the motion sensor is set too high, it may easily cause the application to malfunction and affect the user experience. In addition, other types of sensors may also encounter similar problems in actual operation.

SUMMARY

According to the first aspect of this disclosure, a sensitivity adjustment method of a sensor is provided. The sensitivity adjustment method is applied on an electronic device. The electronic device is coupled to a target sensor. The sensitivity adjustment method of the sensor includes: receiving sensing data from the target sensor in a situation that the electronic device runs a target program; activating a sensitivity adjustment rule according to the target program; adjusting the sensing data according to the sensitivity adjustment rule; and providing adjusted sensing data to the target program.

According to the second aspect of this disclosure, an electronic device is provided. The electronic includes a sensing interface and a processor. The sensing interface is coupled to a target sensor. The processor is coupled to the sensing interface. The processor is configured to: receive sensing data from the target sensor in a situation of running a target program; activating a sensitivity adjustment rule according to the target program; adjusting the sensing data according to the sensitivity adjustment rule; and providing adjusted sensing data to the target program.

Based on the above, when the electronic device runs the target program, the sensing data is received from the target sensor. In addition, the sensitivity adjustment rule is activated according to the target program and used to adjust the sensing data. The adjusted sensing data is then provided to the target program. By activating corresponding sensitivity adjustment rules according to different types of target programs, the user experience can be effectively improved.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
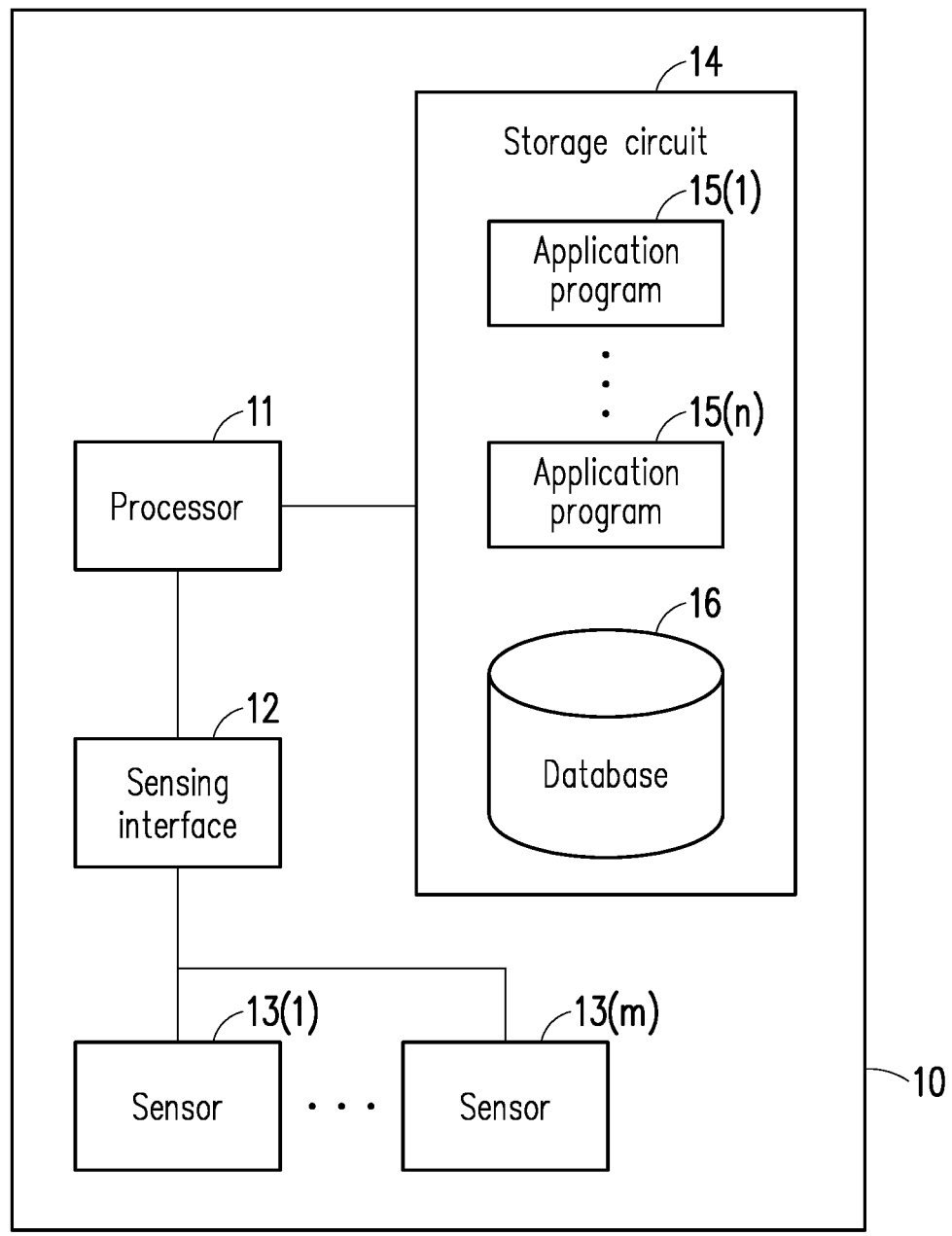
FIG. 1 is a schematic diagram of an electronic device according to an embodiment of the disclosure.

Referring to FIG. 1, an electronic device 10 may include various electronic devices with computing and data processing functions, such as smart phones, tablet computers, laptop computers, personal computers, servers, and game consoles.

The electronic device 10 may include a processor 11, a sensing interface 12, sensors 13(1) to 13(m), and a storage circuit 14. The processor 11 is in charge of the whole or part of the operation of the electronic device 10. For example, the processor 11 may include a central processing unit (CPU) or other programmable general-purpose or special-purpose microprocessors, a digital signal processor (DSP), a programmable controller, an application specific integrated circuit (ASIC), a programmable logic device (PLD) or other similar devices, or a combination of these devices.

The sensing interface 12 is coupled to the processor 11. The sensing interface 12 may be configured to transmit signals between the processor 11 and the sensors 13(1) to 13(m). For example, the sensing interface 12 may conform to connection interface specifications such as I2C (inter-integrated circuit) or serial peripheral interface bus (SPI). In addition, the sensing interface 12 may include an interface circuit conforming to the above-mentioned or similar connection interface specifications. It should be noted that, in an embodiment, the sensing interface 12 and the sensors 13(1) to 13(m) may also be connected one-to-one (that is, one sensing interface is coupled to one sensor), but the disclosure is not limited thereto. The related configuration is the conventional technology, and details thereof are not repeated here.

The sensors 13(1) to 13(m) are coupled to the sensing interface 12. The sensors 13(1) to 13(m) may include various types of sensors such as motion sensors, proximity sensors, light sensors, and temperature sensors, and the number of the sensors 13(1) to 13(m) may be one or more. The disclosure is not intended to limit the number. The motion sensor can detect various physical actions such as rotating, shaking, tilting, and moving performed by the electronic device and generate corresponding sensing data in response to the physical actions. The proximity sensor can detect an external object approaching the electronic device 10, and generate corresponding sensing data in response to the distance between the external object and the electronic device 10. The light sensor can detect the light or brightness of the external environment, and generate corresponding sensing data accordingly. The temperature sensor can detect the temperature of the internal or external environment of the electronic device 10, and generate corresponding sensing data accordingly. In addition, other types of sensors can also generate corresponding sensing data according to preset sensing mechanisms, which will not be described in detail here.

The storage circuit 14 is coupled to the processor 11. The storage circuit 14 is configured to store data. For example, the storage circuit 14 may include a volatile storage circuit and a non-volatile storage circuit. The volatile storage circuit is used for volatile storage of data. For example, the volatile storage circuit may include a random access memory (RAM) or similar volatile storage media. The non-volatile storage circuit is used for non-volatile storage of data. For example, the non-volatile storage circuit may include a read only memory (ROM), a solid state disk (SSD), a hard disk drive (HDD), a flash memory, an embedded multimedia card (eMMC), a universal flash storage (UFS) device, or similar non-volatile storage media.

The storage circuit 14 stores application programs 15(1) to 15(n) and a database (also referred to as conversion database) 16. The application programs 15(1) to 15(n) are independent applications, and the application programs 15(1) to 15(n) are different from one another. For example, the application programs 15(1) to 15(n) have different program names. The processor 11 can execute at least one of the application programs 15(1) to 15(n). The program image of the executed application program 15(k) may be presented to the user via a display (not shown) of the electronic device 10.

The application programs 15(1) to 15(n) may include application programs that operate according to the sensing data provided by at least one of the sensors 13(1) to 13(m), such as various game programs and/or calling programs. For example, some types of game programs can control the game character to move in a specific direction or change the perspective in the game according to the sensing data from the motion sensor among the sensors 13(1) to 13(m). Besides, when the user makes a call through the handheld electronic device 10, the calling program can determine whether to turn off the screen of the electronic device 10 according to the sensing data from the proximity sensor or the light sensor among the sensors 13(1) to 13(m). In addition, the application programs 15(1) to 15(n) may also include application programs that operate normally without the sensing data provided by any one of the sensors 13(1) to 13(m), such as browser programs, email programs, and instant messenger programs. The disclosure is not intended to limit the number and types of the application programs 15(1) to 15(n).

The conversion database 16 stores conversion data corresponding to one or more sensitivity adjustment rules. The sensitivity adjustment rule may be used to adjust the sensing data generated or provided by at least one of the sensors 13(1) to 13(m). In an embodiment, adjusting the sensing data generated or provided by at least one of the sensors 13(1) to 13(m) may be equivalent to or regarded as adjusting the sensitivity of at least one of the sensors 13(1) to 13(m). For example, when a sensitivity adjustment rule is activated, the conversion data corresponding to the sensitivity adjustment rule may be used to adjust the sensing data generated or provided by at least one of the sensors 13(1) to 13(m).

Thereby, the effect of adjusting the sensitivity of at least one of the sensors 13(1) to 13(m) is achieved.

When the electronic device 10 (or the processor 11) runs a specific application program (also referred to as target program) (for example, the application program 15(k)) of the application programs 15(1) to 15(n), the processor 11 may receive sensing data from at least one of the sensors 13(1) to 13(m). For example, the sensing data may be generated by at least one of the sensors 13(1) to 13(m) in response to various physical actions such as rotating, shaking, tilting, and moving performed by the electronic device 10. For example, when the user tilts the electronic device 10 to the right, the sensing data may reflect the physical action of tilting to the right. Alternatively, from another perspective, the sensing data may reflect the change of the movement trajectory of the electronic device 10 in the physical space when the electronic device 10 performs a specific physical action. Alternatively, the sensing data may also be generated by at least one of the sensors 13(1) to 13(m) in response to the change of the external environment. The related description has been provided above, and details thereof are not repeated here.

In an embodiment, the processor 11 may activate a sensitivity adjustment rule according to the target program. The sensitivity adjustment rule corresponds to the target program. The processor 11 may adjust the sensing data from a specific sensor (also referred to as target sensor) of the sensors 13(1) to 13(m) according to the sensitivity adjustment rule. The number of the target sensors may be one or more. Then, the processor 11 may provide the adjusted sensing data to the target program. The target program may perform a relevant operation behavior according to the adjusted sensing data. For example, when the target program is a game program, the target program may control an operation behavior such as moving of the game character according to the adjusted sensing data. It should be noted that the disclosure is not intended to limit the type of the target program, the number of the target programs, the type of the target sensor, and the number of the target sensors.

In an embodiment, the processor 11 may select one of a plurality of sensitivity adjustment rules (also referred to as candidate sensitivity adjustment rules) in the conversion database 16 according to the current target program and activate the selected sensitivity adjustment rule. For example, in response to the target program being an application program (also referred to as first application program) (for example, the application program 15(p)) of the application programs 15(1) to 15(n), the processor 11 may activate a sensitivity adjustment rule (also referred to as first sensitivity adjustment rule) in the conversion database 16. Alternatively, in response to the target program being another application program (also referred to as second application program) (for example, the application program 15(q)) of the application programs 15(1) to 15(n), the processor 11 may activate another sensitivity adjustment rule (also referred to as second sensitivity adjustment rule) in the conversion database 16. The first application program corresponds to the first sensitivity adjustment rule, the second application program corresponds to the second sensitivity adjustment rule, and the first sensitivity adjustment rule is different from the second sensitivity adjustment rule.

In an embodiment, for the same piece of sensing data reported by the target sensor, the adjustment result of the sensing data according to the first sensitivity adjustment rule is different from the adjustment result of the sensing data according to the second sensitivity adjustment rule. For example, it is assumed that the sensing data includes the value "1.2." According to the first sensitivity adjustment rule, the value "1.2" in the sensing data may be increased to the value "2.4" (that is, the original value is multiplied by "2"). In an embodiment, increasing the value in the sensing data may be equivalent to increasing the sensitivity of the target sensor. However, according to the second sensitivity adjustment rule, the value "1.2" in the sensing data may be increased to the value "3.6" (that is, the original value is multiplied by "3") or reduced to the value "0.6" (that is, the original value is multiplied by "0.5"). In an embodiment, reducing the value in the sensing data may be equivalent to reducing the sensitivity of the target sensor. However, the disclosure is not intended to limit the actual multiplication or reduction ratio of each sensitivity adjustment rule to the sensing data.

In an embodiment, the target program refers to a program currently running in the foreground (also referred to as foreground program). For example, it is assumed that at a certain point in time, the processor 11 simultaneously runs a plurality of application programs of the application programs 15(1) to 15(n). In this case, the target program refers to one single foreground program among the application programs being run at that point in time, instead of the rest of the programs (also referred to as background programs) running in the background among the application programs being run. Those skilled in the art should be able to know the difference between the foreground program and the background program, so details thereof are not repeated here.

In other words, while the target program (that is, the foreground program) is performed, the sensing data reported by the target sensor may be adjusted by a specific sensitivity adjustment rule, and then the adjusted sensing data may be provided to the target program (that is, the foreground program) for use. Thereby, the same or similar effect as setting the sensitivity of the target sensor to a better or best state according to the target program is achieved.

In an embodiment, the processor 11 may continuously detect whether the target program (that is, the foreground program) changes. In response to the target program changing, the processor 11 may change the currently activated sensitivity adjustment rule. For example, in response to the target program being switched from the first application program of the application programs 15(1) to 15(n) to the second application program of the application programs 15(1) to 15(n), the processor 11 may switch the currently activated sensitivity adjustment rule from the first sensitivity adjustment rule to the second sensitivity adjustment rule. Thereby, regardless of the target program currently run by the electronic device 10, the sensitivity of the target sensor can be automatically set to a better or best state according to the target program.

In an embodiment, before actually adjusting the sensing data according to the sensitivity adjustment rule, the processor 11 may perform a normalization operation on the sensing data. The normalization operation is used to normalize (for example, adjust) the value of the sensing data to a specific value range (also referred to as target value range). For example, the target value range may be between the value "0" and the value "1," but the disclosure is not limited thereto. For example, when the original value in the sensing data is "10," the normalization operation may be used to normalize the original value to "0.1"; and when the original value in the sensing data is "20," the normalization operation may be used to normalize the original value to "0.2," and so on. However, the disclosure is not intended to limit the rule or ratio for adjusting the original value in the sensing data.

In other words, no matter what the original value range of the sensing data is, after the normalization operation, the values of the sensing data can be adjusted to be within a value range (that is, the target value range). In an embodiment, the normalization operation may be used to overcome inconsistencies in the specifications of sensing data generated by sensors of different specifications, types, or brands. Then, the processor 11 may adjust the normalized sensing data according to the currently activated sensitivity adjustment rule. It should be noted that, in an embodiment, the processor 11 may not perform the normalization operation on the sensing data, which is not particularly limited in the disclosure.

In an embodiment, the processor 11 may read conversion data corresponding to the currently activated sensitivity adjustment rule from the conversion database 16. Then, the processor 11 may convert a specific value (also referred to as first value) in the sensing data into another value (also referred to as second value) according to the conversion data. The second value is different from the first value. For example, the second value may be greater or less than the first value. Alternatively, in an embodiment, the second value generated through conversion may also be equal to the original first value, which is not particularly limited in the disclosure.

In an embodiment, the conversion data may include one of a conversion function and a conversion table. Both the conversion function and the conversion table may be used to adjust the sensing data according to the currently activated sensitivity adjustment rule. Taking the conversion function as an example, the conversion function may be a linear function or a nonlinear function, which is not particularly limited in the disclosure.

In an embodiment, the processor 11 may input the first value in the sensing data into the conversion function and the conversion table, and obtain the second value according to the output of the conversion function and the conversion table. In an embodiment, the processor 11 may perform an interpolation operation according to the first value and the conversion data to obtain the second value.

Figure 2:
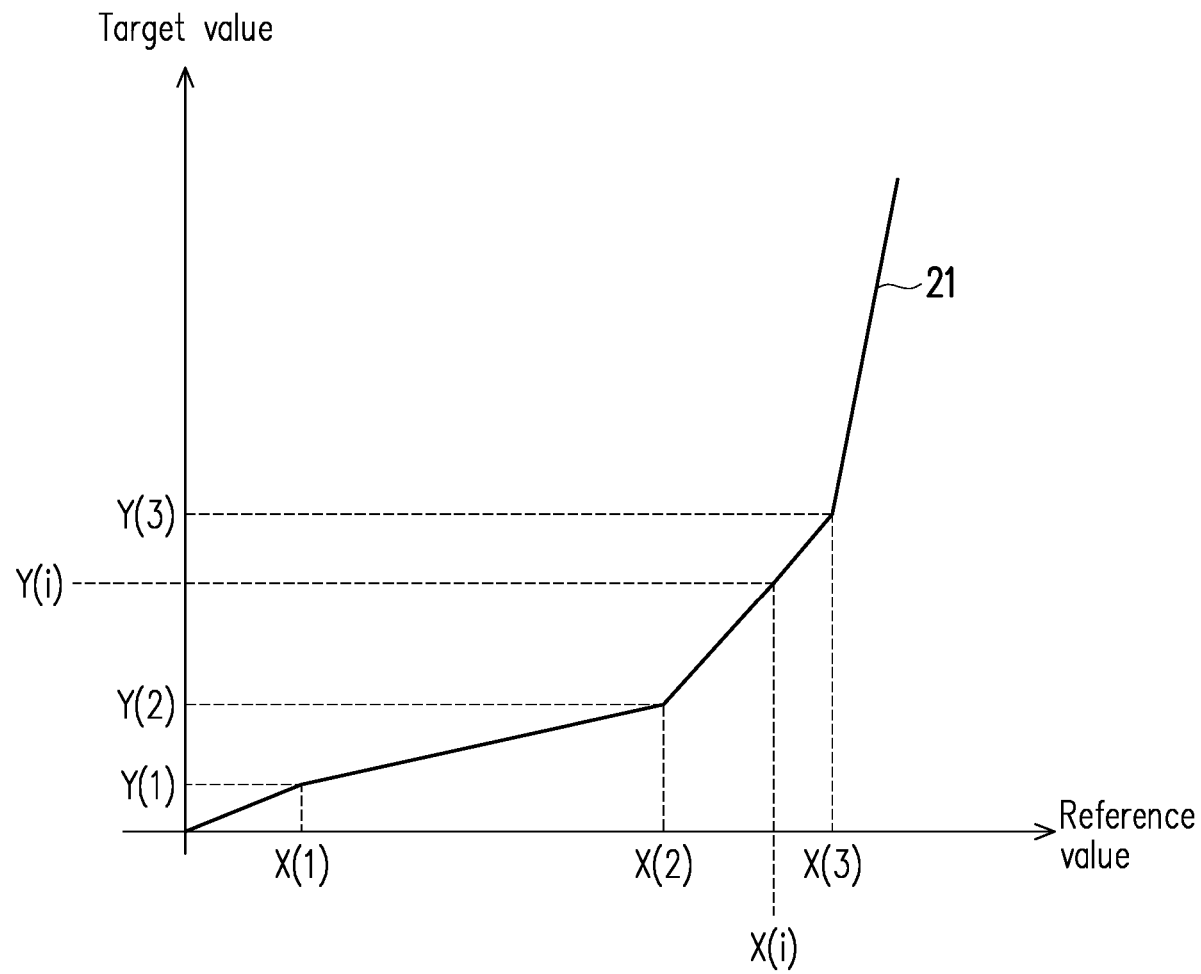
FIG. 2 is a schematic diagram of a conversion function according to an embodiment of the disclosure.

Referring to FIG. 2, it is assumed that the conversion function or the conversion table in a certain piece of conversion data reflects the curve 21. The horizontal axis direction of the curve 21 corresponds to a plurality of preset values (also referred to as reference values), such as X(1), X(2), and X(3). The vertical axis direction of the curve 21 also corresponds to a plurality of preset values (also referred to as target values), such as Y(1), Y(2), and Y(3). The curve 21 (or the conversion function or the conversion table corresponding to the curve 21) may be used to describe the mapping relationship between the reference values X(1), X(2), and X(3) and the target values Y(1), Y(2), and Y(3) respectively. It should be noted that the disclosure is not intended to limit the numbers of the reference values (for example, X(1), X(2), and X(3)) and the target values (for example, Y(1), Y(2), and Y(3)) mapped by the curve 21.

In an embodiment, it is assumed that the first value in the sensing data is one of the reference values X(1), X(2), and X(3), and according to the curve 21, the first value in the sensing data may be directly converted into one of the target values Y(1), Y(2), and Y(3) corresponding to the reference values X(1), X(2), and X(3) respectively. However, in practice, the settings of the reference values X(1), X(2), and X(3) may not cover all possible values of the sensing data. Therefore, in an embodiment, the processor 11 may perform the interpolation operation according to the first value in the sensing data and the curve 21 to obtain the corresponding second value. Thereby, even if the first value in the sensing data is not one of the reference values X(1), X(2), and X(3), the corresponding second value can still be obtained.

In an embodiment, according to the curve 21 or the conversion data corresponding to the curve 21, the processor 11 may obtain a first reference value, a second reference value, a first target value, and a second target value required for performing the interpolation operation. For example, it is assumed that the first value is the value X(i), X(i) is between the reference values X(2) and X(3), the reference value X(2) corresponds to the target value Y(2), and the reference value X(3) corresponds to the target value Y(3), as shown in FIG. 2. The processor 11 may set the reference value X(2), the reference value X(3), the target value Y(2), and the target value Y(3) to the first reference value, the second reference value, the first target value, and the second target value respectively. Then, the processor 11 may perform the interpolation operation according to the value X(i), the reference value X(2), the reference value X(3), the target value Y(2), and the target value Y(3) to obtain the value Y(i). Next, the processor 11 may set the value Y(i) to the second value.

In an embodiment, the processor 11 may perform the interpolation operation according to the following equation (1.1) to obtain the value Y(i).

$$Y(i) = Y(2) + (Y(3) - Y(2)) \times \frac{(X(i) - X(2))}{(X(3) - X(2))} \quad (1.1)$$

Alternatively, in an embodiment, if the value X(i) is between the reference values X(1) and X(2), the processor 11 may perform the interpolation operation according to the following equation (1.2) to obtain the value Y(i).

$$Y(i) = Y(1) + (Y(2) - Y(1)) \times \frac{(X(i) - X(1))}{(X(2) - X(1))} \quad (1.2)$$

It should be noted that, according to different target programs, the conversion data used to adjust the sensing data may reflect different curves 21. Therefore, according to different curves 21, the same first value X(i) may be adjusted to different second values Y(i). In addition, as shown in FIG. 2, the function corresponding to the curve 21 is not a linear function. For example, the curve 21 has different slopes within the value ranges of different reference values. Therefore, for sensing data with different values, the value conversion rules adopted based on the same curve 21 may also be different. For example, when the value X(i) in the sensing data is between the reference values X(2) and X(3), the processor 11 may perform the interpolation operation according to equation (1.1) to obtain the value Y(i). However, when the value X(i) in the sensing data is between the reference values X(1) and X(2), the processor 11 may perform the interpolation operation according to equation (1.2) instead to obtain the value Y(i), and so on.

Returning to FIG. 1, in an embodiment, the target sensor (or at least one of the sensors 13(1) to 13(m)) may be disposed outside the electronic device 10. In an embodiment, the target sensor (or at least one of the sensors 13(1) to 13(m)) may belong to another electronic device, as long as the sensing data generated by the sensors 13(1) to 13(m) can be transmitted to the electronic device 10.

In an embodiment, the processor 11 may register at least one of the sensors 13(1) to 13(m) as a sensor (that is, target sensor) whose sensitivity needs to be adjusted in response to a specific target program (that is, foreground program). For example, the registered target sensor may be recorded in a registration list. After at least one of the sensors 13(1) to 13(m) is registered as the target sensor, once the specific target program is executed, the sensing data from the target sensor is adjusted according to the sensitivity adjustment rule automatically selected by the processor 11. In addition, if at least one of the sensors 13(1) to 13(m) is removed from the registration list, when the specific target program is subsequently executed, the sensing data from the sensor may not be adjusted. Thereby, the operation flexibility in sensitivity adjustment of the sensor can be increased. The related operation details have been described above, and will not be repeated here.

In an embodiment, if the number of the target sensors is more than one, the sensitivity adjustment rule activated according to the target program may be used to adjust the sensing data reported by the multiple target sensors simultaneously. Alternatively, in an embodiment, if the number of the target sensors is more than one, the number of the sensitivity adjustment rules activated according to the target program may also be more than one, so as to adjust the sensing data reported by the multiple target sensors respectively. For example, it is assumed that the target sensors include a first target sensor and a second target sensor, and the sensitivity adjustment rule (for example, the first sensitivity adjustment rule or the second sensitivity adjustment rule) activated according to the target program may include a first sub-sensitivity adjustment rule and a second sub-sensitivity adjustment rule. In the state of running the target program, the first sub-sensitivity adjustment rule can be used to adjust the sensing data from the first target sensor, and the second sub-sensitivity adjustment rule can be used to adjust the sensing data from the second target sensor.

Figure 3:
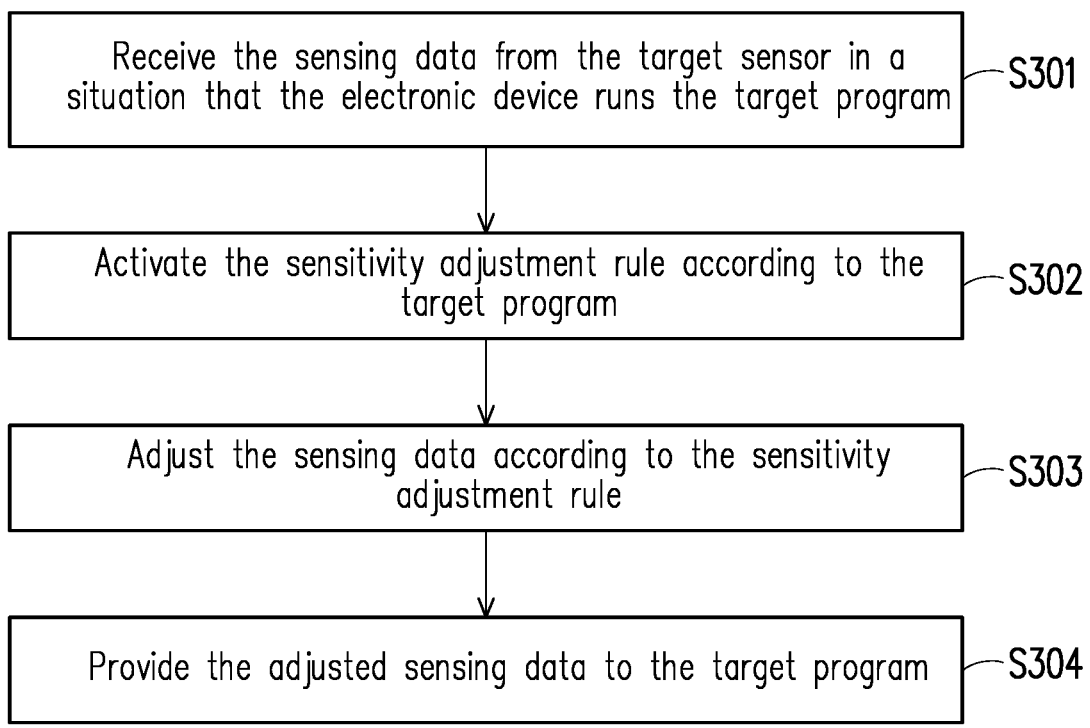
FIG. 3 is a flowchart of a sensitivity adjustment method of a sensor according to an embodiment of the disclosure.

Referring to FIG. 3, in step S301, in a situation that the electronic device runs the target program, the sensing data is received from the target sensor. In step S302, the sensitivity adjustment rule is activated according to the target program. In step S303, the sensing data is adjusted according to the sensitivity adjustment rule. In step S304, the adjusted sensing data is provided to the target program.

Since each step in FIG. 3 has been described in detail above, details thereof will not be repeated here. It should be noted that each step in FIG. 3 can be implemented as a plurality of program codes or circuits, which is not particularly limited in the disclosure. In addition, the method of FIG. 3 may be used in conjunction with the above exemplary embodiment, or may be used alone, which is not particularly limited in the disclosure.

To sum up, while the target program (that is, the foreground program) is executed, the sensing data reported by the target sensor may be adjusted according to a specific sensitivity adjustment rule, and the adjusted sensing data may be provided to the target program (that is, the foreground program) for use. Therefore, regardless of the target program currently run by the electronic device, the sensitivity of the target sensor can be automatically set to a better or best state according to the target program, thereby improving the user experience when the target program is running. For example, when the target program being executed is a game program, the sensitivity of the motion sensor can be increased to improve the quality of game operation. When the target program being executed is not a game program, the sensitivity of the motion sensor can be reduced (or set to the default sensitivity) to prevent the electronic device from malfunctioning according to the sensing result of the overly sensitive motion sensor. Alternatively, when the target program being executed is a calling program, the sensitivity of the proximity sensor or the light sensor can be reduced to allow the user to operate the screen of the electronic device during a call, which may not be possible when the proximity sensor or the light sensor is too sensitive. When the target program being executed is not a calling program, the sensitivity of the proximity sensor or the light sensor may be increased (or set to the default sensitivity) to avoid affecting the daily operation behavior of the electronic device.

Although the disclosure has been described with reference to the embodiments above, they are not intended to limit the disclosure. Those skilled in the art can make some changes and modifications without departing from the spirit and scope of the disclosure. Therefore, the scope of the disclosure should be determined by the following claims.

What is claimed is:

1. A sensitivity adjustment method of a sensor, applied on an electronic device which is coupled to a target sensor, the sensitivity adjustment method of the sensor comprising:
receiving sensing data from the target sensor in a situation that the electronic device runs a target program;
activating a sensitivity adjustment rule according to the target program;
adjusting the sensing data according to the sensitivity adjustment rule; and
providing adjusted sensing data to the target program, wherein the sensing data comprises a first value, the adjusted sensing data comprises a second value, and adjusting the sensing data according to the sensitivity adjustment rule comprises:
performing an interpolation operation according to the first value and conversion data to obtain the second value, wherein a mapping relationship between a plurality of target values and a plurality of reference values are described by the conversion data, and the first value is not one of the reference values corresponding to the target values;
wherein the electronic device runs a plurality of application programs simultaneously, and the target program refers to a foreground program of the plurality of application programs; and
changing the sensitivity adjustment rule in response to the foreground program switching from the first application program of the plurality of application programs to a second application program of the plurality of application programs.

2. The sensitivity adjustment method of the sensor according to claim 1, wherein the sensitivity adjustment rule comprises a first sensitivity adjustment rule and a second sensitivity adjustment rule, and activating the sensitivity adjustment rule according to the target program comprises:
activating the first sensitivity adjustment rule in response to the target program being a first application program; and
activating the second sensitivity adjustment rule in response to the target program being a second application program, wherein the first sensitivity adjustment rule is different from the second sensitivity adjustment rule.

3. The sensitivity adjustment method of the sensor according to claim 1, wherein adjusting the sensing data according to the sensitivity adjustment rule further comprises:
performing a normalization operation on the sensing data to normalize a value of the sensing data to a target value range; and
adjusting normalized sensing data according to the sensitivity adjustment rule.

4. The sensitivity adjustment method of the sensor according to claim 1, wherein adjusting the sensing data according to the sensitivity adjustment rule further comprises:
reading the conversion data corresponding to the sensitivity adjustment rule, wherein the conversion data comprises one of a conversion function and a conversion table, wherein the second value is different from the first value.

5. The sensitivity adjustment method of the sensor according to claim 4, wherein the conversion function is one of a linear function and a nonlinear function.

6. The sensitivity adjustment method of the sensor according to claim 1, wherein performing the interpolation operation according to the first value and the conversion data to obtain the second value comprises:
obtaining a first reference value, a second reference value, a first target value, and a second target value according to the first value and the conversion data, wherein the first value is between the first reference value and the second reference value, the first reference value corresponds to the first target value, and the second reference value corresponds to the second target value; and
performing the interpolation operation according to the first value, the first reference value, the second reference value, the first target value, and the second target value to obtain the second value.

7. An electronic device, comprising:
a sensing interface configured to be coupled to a target sensor; and
a processor coupled to the sensing interface,
wherein the processor is configured to:
receive sensing data from the target sensor in a situation of running a target program;
activate a sensitivity adjustment rule according to the target program; adjusting the sensing data according to the sensitivity adjustment rule; and
providing adjusted sensing data to the target program,
wherein the sensing data comprises a first value, the adjusted sensing data comprises a second value, and adjusting the sensing data according to the sensitivity adjustment rule comprises:
obtaining a first reference value, a second reference value, a first target value, and a second target value according to the first value and conversion data based on different target programs, wherein the first value is between the first reference value and the second reference value, the first reference value corresponds to the first target value, and the second reference value corresponds to the second target value; and
performing an interpolation operation according to the first value, the first reference value, the second reference value, the first target value, and the second target value to obtain the second value.

8. The electronic device according to claim 7, wherein the sensitivity adjustment rule comprises a first sensitivity adjustment rule and a second sensitivity adjustment rule, and an operation of the processor activating the sensitivity adjustment rule according to the target program comprises:
activating the first sensitivity adjustment rule in response to the target program being a first application program; and
activating the second sensitivity adjustment rule in response to the target program being a second application program, wherein the first sensitivity adjustment rule is different from the second sensitivity adjustment rule.

9. The electronic device according to claim 7, wherein the processor runs a plurality of application programs simultaneously, and the target program refers to a foreground program of the plurality of application programs.

10. The electronic device according to claim 9, wherein the processor is further configured to:
change the sensitivity adjustment rule in response to the foreground program switching from the first application program of the plurality of application programs to the second application program of the plurality of application programs.

11. The electronic device according to claim 7, wherein an operation of the processor adjusting the sensing data according to the sensitivity adjustment rule further comprises:
performing a normalization operation on the sensing data to normalize a value of the sensing data to a target value range; and
adjusting normalized sensing data according to the sensitivity adjustment rule.

12. The electronic device according to claim 7, wherein an operation of the processor adjusting the sensing data according to the sensitivity adjustment rule further comprises:
reading conversion data corresponding to the sensitivity adjustment rule, wherein the conversion data comprises one of a conversion function and a conversion table, wherein the second value is different from the first value.

13. The electronic device according to claim 12, wherein the conversion function is one of a linear function and a nonlinear function.

* * * * *